Patented Apr. 11, 1950

2,503,772

UNITED STATES PATENT OFFICE 2,503,772

TALL OIL ESTERS AND PROCESS OF MAKING THEM

John B. Rust, East Hanover, N. J., assignor, by direct and mesne assignments, of one-half to Montclair Research Corporation, a corporation of New Jersey, and one-half to Ellis-Foster Company, a corporation of New Jersey No Drawing. Application October 26, 1946, Serial No. 706,065

7 Claims. (Cl. 260—22)

This invention relates to tall oil reaction products capable of use in protective and decorative coatings and in other fields where an air-drying or heat-hardening binder is required. In particular it relates to esters obtained by reacting tall oil with both a polyhydric alcohol and an unsaturated alcohol monoester of a dicarboxylic acid.

Tall oil is a complex mixture containing primarily fatty acids, natural resin acids and unsaponifiable matter composed largely of sterols. It is a cheap by-product and is obtained by acid decomposition of the crude soap formed when pinewood chips are digested with alkaline pulping chemicals as in the making of kraft pulp. Crude tall oil is a dark-colored liquid of disagreeable odor but when properly refined it is improved in color and odor.

Although the composition of tall oil varies somewhat depending on the type of wood and the processive steps, typical analyses generally show the principal constituents in the following range:

Resin acids _____ per cent__ 30–45
Fatty acids _____ do____ 40–65
Unsaponifiables _____ do____ 5–18

The fatty acids include drying and non-drying unsaturated acids in substantially the following proportions:

Fatty acids as linolenic _____ per cent__ 35–45
Fatty acids as linoleic _____ do____ 15–25
Fatty acids as oleic _____ do____ 45–55

Tall oil esterified with polyhydric alcohols has been used as a cheap raw material for coating compositions. However, it is not a direct substitute for the regular drying oils and its use in this way is generally warranted only when the drying oils proper are unduly high in price or unavailable. Such products are usually dark colored, relatively slow drying and yellow badly when baked. However, the point which distinguishes them from the products of this invention is that they are not heat-convertible.

It is an object of this invention to form a cheap product which is both oxygen-convertible and heat-convertible and which may be used in air-drying and baking coating compositions. A related object is to form an oily material which may be kettle-bodied in a short time and which yields varnishes of acceptable color which dry fast, are non-yellowing and have good water resistance. Another object is to provide a material suitable as a printing ink vehicle or as a binder in linoleum, oil cloth, cold molding compositions and the like. Still another object is to produce a grinding vehicle of low acid number for paints and enamels. The products of this invention may be blown with air and further thickened.

These objects are achieved by the present invention where a polyhydric alcohol is esterified with tall oil and an unsaturated monohydric alcohol monoester of a dicarboxylic acid. If the preparation is attempted by heating all the reactants simultaneously gelation occurs before esterification is complete. The preferred process therefore consists in heating tall oil with an excess of polyhydric alcohol and then esterifying the hydroxyl-containing ester thus obtained with the dicarboxylic acid monoester. Thus, 1 mole of a polyhydric alcohol $R(OH)_n$ containing more than 2 hydroxyl groups (R being the hydrocarbon residue and $n$ the number of hydroxyl groups) is heated with from 2 to $(n-0.5)$ moles of tall oil until substantially all the tall oil is esterified, the combining molecular weight of the tall oil being simply calculated from its acid number. The temperature in this step should be high enough to cause esterification and for esterification to proceed in a reasonable time the temperature is from about 180° to 300° C. and preferably between 200° and 250° C., heating being continued until the reaction mixture has an acid number less than 20. The hydroxyl-containing ester is then reacted with an amount of the dicarboxylic acid monoester to esterify the free hydroxyl groups thereof. This step may be conducted at the same temperature as the first although preferably it is run at a lower temperature (between 100° and 200° C.) and in the presence of an esterification catalyst. This results in rapid esterification and less tendency to form an infusible mass before suitably complete esterification occurs.

The proportions of reactants are such as to form a reaction product which (based on 1 mole of polyhydric alcohol $R(OH)_n$) may be schematically represented as follows:

$$(ME)_x R(TO)_{n-x}$$

where ME and TO represent the dicarboxylic acid monoester and tall oil, respectively; $n$ is the number of hydroxyl groups of the polyhydric alcohol $R(OH)_n$; and $x$ is the number of moles of dicarboxylic monoester, being a number between 0.5 and $(n-2)$. Thus the products comprise a polyhydric alcohol $R(OH)_n$ esterified with from $(n-2)$ to 0.5 moles of dicarboxylic acid monoester and correspondingly from 2 to $(n-0.5)$ moles of tall oil. When the proportion of dicarboxylic acid monoester is increased the tendency is to cause gelation before esterification is complete. When the proportion of dicarboxylic acid monoester is decreased the mixed ester does not have sufficiently improved oxygen- and heat-convertibility. Significant improvement results when a slight excess of the polyhydric alcohol (not more than 0.1 mole) is used. That is, the tall oil and dicarboxylic acid monoester together amount to $n$ moles and the polyhydric is from 1 to 1.1 moles.

The products are clear, viscous, oxygen-convertible liquids of color generally lighter than that of the tall oil used. Low cost coupled with their drying characteristics make them particularly attractive. As is shown below they possess good drying properties and a low gel-time when heated at a high temperature. When impurities from the tall oil or elsewhere cause turbidity, simple filtration produces a bright-appearing oil. The acid number is below 25.

The polyhydric alcohol is any polyhydroxy compound reactive at the given temperature. It preferably contains more than 2 hydroxyl groups since glycols containing no other functional groups give relatively slow drying products. Suitable polyhydric alcohols include glycerol, polyglycerol, pentaerythritol, dipentaerythritol, polypentaerythritol, mannitol, sorbitol, trimethylolpropane and the like.

The alcohol radical of the dicarboxylic acid monoester is that of a beta- unsaturated monohydric alcohol containing from 3 to 4 carbon atoms, such as allyl, methallyl, crotyl, butenyl or propargyl alcohols. The dicarboxylic acid may be phthalic, maleic, fumaric, succinic, adipic, sebacic, itaconic, citraconic and the like, as well as the dicarboxylic acids obtained by reacting an alpha- unsaturated alpha- beta-dicarboxylic acid such as maleic with a conjugated diolefin such as butadiene, cyclopentadiene, isoprene, etc. Monoallyl maleate and monoallyl phthalate are illustrative of such monoesters whose use is of advantage on account of their ease of preparation and for economic reasons.

The esterification catalyst used in the reaction of the polyhydric alcohol-tall oil partial ester with the dicarboxylic acid monoester is any soluble strong acid such as hydrochloric, sulfuric, sulfamic, benzenesulfonic acid and the like and is used in amount from about 0.05 to .5% of the reaction mixture. Paratoluenesulfonic acid is also suitable and is used in the following examples which are given to illustrate the present invention.

In these examples the tall oil was commercial material meeting the following specifications:

| | |
|---|---|
| Acid number | 180–185 |
| Saponification number | 181–186 |
| Fatty acids _____per cent__ | 57–62 |
| Resin acids _____do____ | 33–36 |
| Sterols, higher alcohols, etc_____do____ | 5–7 |
| Color (Lovibond) | 55 Y and 30 R |

Gel time of the products is the time required for 50 gm. of the oil to form a gel when heated at 270°–275° C. Drying time is the time required to form a hard non-tacky film from a solution containing 25 parts of the ester, 15 parts of mineral spirits and enough lead and cobalt naphthenate to furnish 0.6% Pb and 0.06% Co based on the ester.

Example 1

460.5 parts of tall oil (1.5 moles, combining weight of 307) and 71.4 parts of pentaerythritol (0.525 mole) were heated together in a 1-liter, 3-neck flask equipped with a stirrer, thermometer, carbon dioxide inlet tube, and water-trap connected to a water-cooled condenser. Heating was carried out at 210°–220° C. for 6 hours. The resulting tall oil partial ester possessed an acid number of 6.1. 76.6 parts of monoallyl maleate and 1.2 parts of para-toluenesulphonic acid were then added and heating continued at 175°–190° C. for 10 hours. A clear, relatively viscous oil was obtained which had an acid number of 11.4. Gel time 10 minutes. Drying time 12 hours. Sward rocker hardness after 48 hours, 35.

Example 2

409.2 parts of tall oil (1⅓ moles) and 7.14 parts of pentaerythritol (0.525 mole) were heated together in a 1-liter, 3-neck flask equipped with a stirrer, thermometer, carbon dioxide inlet tube, and water-trap connected to a water-cooled condenser. Heating was carried out at 210°–220° C. for 5½ hours. The resulting tall oil partial ester had an acid number of 7.6. 102.1 parts of monoallyl maleate and 1.1 parts of para-toluenesulphonic acid were then added and heating continued at 175°–190° C. for 12 hours. A clear, relatively viscous oil was formed. Acid number 12.2. Gel time 4 minutes. Drying time 8 hours. Sward rocker hardness after 48 hours, 39.

Example 3

450 parts of tall oil (1.4 moles) and 71.4 parts of pentaerythritol (0.525 mole) were heated together in a 1-liter, 3-neck flask equipped with a stirrer, thermometer, carbon dioxide inlet tube, and water-trap connected to a water-cooled condenser. Heating was carried out at 210°–220° C. for 5¾ hours. The resulting tall oil partial ester showed an acid number of 4.7. 92 parts of monoallyl maleate and 1.2 parts of para-toluenesulphonic acid were added and heating continued at 175°–190° C. for 10 hours. The product was a clear, relatively viscous oil. Acid number 10.9. Gel time 10 minutes. Drying time 7 hours. Sward rocker hardness after 48 hours, 43.

Example 4

460.5 parts of tall oil (1.5 moles) and 96.6 parts of glycerol (1.05 moles) were heated together in a 1-liter, 3-neck flask equipped with a stirrer, thermometer, carbon dioxide inlet tube, and water-trap connected to a water-cooled condenser. Heating was carried out at 210°–220° C. for 6½ hours. The resulting tall oil partial ester possessed an acid number of 5.3. 229.8 parts of monoallyl maleate and 1.6 parts of para-toluenesulphonic acid were then added and heating continued at 175°–190° C. for 11½ hours. This resulted in a clear, relatively viscous oil. Acid number 11.9. Gel time 3 minutes. Drying time 9 hours. Sward rocker hardness after 48 hours, 41.

Example 5

429.8 parts of tall oil (1.4 moles) and 71.4 parts of pentaerythritol (0.525 mole) were heated together in a 1-liter, 3-neck flask equipped with a stirrer, thermometer, carbon dioxide inlet tube, and water-trap connected to a water-cooled condenser. Heating is carried out at 210°–220° C. for 6 hours. The resulting tall oil partial ester possessed an acid number of 7.1. Next were added 123.6 parts of monoallyl phthalate and 1.25 parts of para-toluenesulphonic acid and the heating continued at 175°–190° C. for 11¼ hours. A clear, light-colored, relatively viscous oil was obtained which possessed an acid number of 10.2. Gel time 45 minutes. Drying time 10½ hours. Sward rocker hardness after 48 hours, 53.

The fatty acid occurring in tall oil in major amount is oleic acid. The following example indicates the type of product obtained from oleic acid alone in comparison with tall oil.

Example 6

A mixture of 423 parts of oleic acid (1.5 moles, combining weight=282) and 72.5 parts of glycerol (0.79 mole) was heated at 210°–220° C. for 6 hours in a 1-liter, 3-neck flask equipped with a stirrer, thermometer, carbon dioxide inlet tube, and water-trap connected to a water-cooled condenser. The resulting partial ester had an acid number of 7.4. 115 parts of monoallyl maleate and 1.22 parts of para-toluenesulphonic acid were then added and heating continued at 175°–190° C. for 9¾ hours. A light-colored, non-viscous oil was secured which possessed an acid number of 13.3. Gel time 5 minutes. Drying time 15 hours. Sward rocker hardness after 48 hours, 19.

The following example shows a comparison between tall oil esterified according to the present invention and illustrated in preceding examples, and tall oil esterified with a polyhydric alcohol alone. It will be noted that a simple tall oil-polyhydric alcohol ester does not gel readily when heated and that it dries relatively slowly.

Example 7

409.3 parts of tall oil (1⅓ moles) and 47.6 parts of pentaerythritol (⅓ mole) were heated together in a 1-liter, 3-neck flask equipped with a stirrer, thermometer, carbon dioxide inlet tube, and water-trap connected to a water-cooled condenser. Heating was carried out at 210°–220° C. for 14 hours. The resulting tall oil ester possessed a medium viscosity and an acid number of 9.4.

This tall oil ester on heating for 1½ hours at 270°–275° C. became relatively viscous, but did not gel. It was soluble and fusible after heating. Drying time of the product 13 hours. Sward rocker hardness after 48 hours, 27.

Varnishes of each of the above described oils were prepared by heating 20 parts of ester gum and 50 parts of the modified tall oil product to approximately 275° C. in 15 minutes and holding at this temperature until a string of 18 inches was secured.

| Varnish No. | Minutes at Top Temperature |
|---|---|
| 1 | 15 minutes at 270°–280° C. |
| 2 | 13 minutes at 235°–255° C. |
| 3 | 20 minutes at 250°–260° C. |
| 4 | 17 minutes at 250°–260° C. |
| 5 | 40 minutes at 260°–270° C. |
| 6 | 37 minutes at 260°–270° C. |
| 7 | 90 minutes at 300°–310° C. |

The resulting varnish bases were reduced with V. M. and P. naphtha to 50% solids. Driers were added as follows:

A. To a sample of each varnish was added 0.015% cobalt as cobalt naphthenate based upon the modified tall oil content. Films were poured and, after air-drying for one hour, they were baked for one hour at 120° C. Darkening effects, hardness of baked film, and effects of tap water after 24 hours immersion are tabulated in the following table.

| Varnish No. | Degree of Darkening | Sward Rocker Hardness | Effect of tap water after 24 hr. immersion |
|---|---|---|---|
| 1 | some yellowing | 69 | unaffected. |
| 2 | no yellowing | 77 | Do. |
| 3 | do | 81 | Do. |
| 4 | do | 60 | Do. |
| 5 | do | 73 | Do. |
| 6 | do | 36 | clouded—softened. |
| 7 | yellowed badly | 43 | Do. |

B. To a sample of each varnish was added 0.6% lead and 0.6% cobalt as naphthenates based upon the modified tall oil content of the varnish. Films were poured and allowed to air dry. The following drying time and hardness data were secured.

| Varnish No. | Drying Time | | Sward Rocker Hardness after air-drying for 48 hrs. |
|---|---|---|---|
| | Dust Free | Tack Free | |
| | Hours | Hours | |
| 1 | 2 | 5¼ | 69 |
| 2 | 1¼ | 4½ | 69 |
| 3 | 1¼ | 4¾ | 69 |
| 4 | 2¼ | 5¾ | 73 |
| 5 | 2 | 5½ | 71 |
| 6 | 3 | 7½ | 39 |
| 7 | 1¾ | 6½ | 53 |

The products of this invention may be copolymerized with various unsaturated polymerizable compounds by heating therewith, preferably in the presence of a peroxy compound. Compounds copolymerizable therewith include styrene, vinyl esters, acrylic and methyl methacrylic esters, and the like. The products may be cooked with various oil-soluble resins to form varnishes. They are also compatible with urea-formaldehyde, melamine-formaldehyde, phenol-aldehyde, alkyd resins and the like and may be used in combination therewith.

The reactions of this invention may be carried out in the presence of an inert solvent, if desired; or in an azeotropic distillation mixture.

This is a continuation in part based on my copending application Serial No. 654,798, filed March 16, 1946, wherein is described and claimed the products obtained by reacting varying proportions of rosin and drying oil acids, together with a dicarboxylic acid monoester and a polyhydric alcohol. Tall oil distinguishes in various ways from the mixture of rosin and drying oil acids.

I claim:

1. A heat-convertible liquid for coating compositions comprising a polyhydric alcohol esterified with tall oil and dicarboxylic acid monoester of a beta-unsaturated monohydric alcohol having from 3 to 4 carbon atoms, the polyhydric alcohol containing more than 2 hydroxyl groups and having the formula $R(OH)_n$, where R is a saturated hydrocarbon residue and $n$ is the number of hydroxyl groups, the proportions being from 2 to $(n-0.5)$ moles of tall oil, from $(n-2)$ to 0.5 moles of dicarboxylic acid monoester, from 1 to 1.1 moles of polyhydric alcohol, and the total moles of tall oil and dicarboxylic acid monoester being $n$.

2. An oxygen- and heat-convertible liquid mixed-ester comprising pentaerythritol esterified with tall oil and a dicarboxylic acid monoester of a beta-unsaturated monohydric alcohol having from 3 to 4 carbon atoms, the proportions being from 2 to 3½ moles of tall oil, from 2 to ½ moles of dicarboxylic acid monoester, from 1 to 1.1 moles of pentaerythritol, and the total moles of tall oil and dicarboxylic acid monoester being 4.

3. An oxygen- and heat-convertible liquid mixed-ester comprising glycerol esterified with tall oil and a dicarboxylic acid monoester of a beta-unsaturated monohydric alcohol having from 3 to 4 carbon atoms, the proportions being from 2 to 2½ moles of tall oil, from 1 to ½ mole of dicarboxylic acid monoester, from 1 to 1.1 moles of glycerol, and the total moles of tall oil and dicarboxylic acid monoester being 3.

4. An oxygen- and heat-convertible liquid mixed-ester comprising pentaerythritol esterified with tall oil and monoallyl maleate, the proportions being from 2 to 3½ moles of tall oil, from 2 to ½ moles of allyl maleate, from 1 to 1.1 moles of pentaerythritol, and the total moles of tall oil and monoallyl maleate being 4.

5. An oxygen- and heat-convertible liquid mixed-ester comprising pentaerythritol esterified with tall oil and monoallyl phthalate, the proportions being from 2 to 3½ moles of tall oil, from 2 to ½ moles of monoallyl phthalate, from 1 to 1.1 moles of pentaerythritol, and the total moles of tall oil and monoallyl phthalate being 4.

6. An oxygen- and heat-convertible liquid mixed-ester comprising glycerol esterified with tall oil and monoallyl maleate, the proportions being from 2 to 2½ moles of tall oil, from 1 to ½ mole of monoallyl maleate, from 1 to 1.1 moles of glycerol, and the total moles of tall oil and monoallyl maleate being 3.

7. The process of making a tall oil ester having improved air-drying characteristics, which comprises heating at between about 180° and 300° C., tall oil and a polyhydric alcohol $R(OH)_n$ containing more than 2 hydroxyl groups and in which R represents a saturated hydrocarbon residue and $n$ is the number of hydroxyl groups, to form a hydroxyl-containing ester, and then adding a dicarboxylic acid monoester of a beta-unsaturated monohydric alcohol having from 3 to 4 carbon atoms in proportion to esterify said hydroxyl-containing ester, and an acid esterification catalyst, and heating at between about 100° and 200° C. until an ester of low acid number is obtained; the proportions being from 2 to $(n-0.5)$ moles tall oil, from $(n-2)$ to 0.5 moles of dicarboxylic acid monoester from 1 to 1.1 moles polyhydric alcohol, and the total moles of tall oil and dicarboxylic acid monoester being $n$.

JOHN B. RUST.

REFERENCES CITED

The following references are of record in the file of this patent:

UNITED STATES PATENTS

| Number | Name | Date |
|---|---|---|
| 2,280,242 | Kropa et al. | Apr. 21, 1942 |

FOREIGN PATENTS

| Number | Country | Date |
|---|---|---|
| 506,796 | Great Britain | June 1, 1939 |